United States Patent
Jung et al.

(10) Patent No.: US 11,299,102 B2
(45) Date of Patent: Apr. 12, 2022

(54) ROOF RACK FOR VEHICLE

(71) Applicant: LG Hausys, Ltd., Seoul (KR)

(72) Inventors: Yong-Woo Jung, Gunpo-si (KR);
Yong-Han Kang, Seoul (KR);
Wook-Hee Lee, Seoul (KR); Jun-Sik Woo, Ulsan (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 16/338,057

(22) PCT Filed: Sep. 25, 2017

(86) PCT No.: PCT/KR2017/010560
§ 371 (c)(1),
(2) Date: Mar. 29, 2019

(87) PCT Pub. No.: WO2018/062792
PCT Pub. Date: Apr. 5, 2018

(65) Prior Publication Data
US 2020/0023783 A1    Jan. 23, 2020

(30) Foreign Application Priority Data
Sep. 29, 2016    (KR) .................. 10-2016-0125423

(51) Int. Cl.
*B60R 9/04* (2006.01)
*B60R 9/12* (2006.01)

(52) U.S. Cl.
CPC . *B60R 9/04* (2013.01); *B60R 9/12* (2013.01)

(58) Field of Classification Search
CPC .................................................. B60R 9/04
See application file for complete search history.

(56) References Cited

U.S. PATENT DOCUMENTS 4,899,917 A * 2/1990 Bott ................. B60R 9/045
224/326
5,617,981 A * 4/1997 Ricker ............... B60R 9/04
224/309
(Continued)

FOREIGN PATENT DOCUMENTS

EP      0845391 A2 *  6/1998 ............... B60R 9/04
JP      08-268172 A    10/1996
(Continued)

OTHER PUBLICATIONS

Engineersrule.com, "All is not Sunk: How to Deal with Sink Marks in an Injection-Molded Part", published Jun. 21, 2016.*
(Continued)

*Primary Examiner* — Scott T McNurlen
(74) *Attorney, Agent, or Firm* — Hauptman Ham, LLP

(57) ABSTRACT

Disclosed is a roof rack for a vehicle, which is capable of achieving an improvement in vehicle fuel efficiency and a weight lightening goal by using a lightweight material, allows for improved productivity and assembly properties by simplifying the number of parts and process therefor, has an excellent degree of freedom in design, and is capable of achieving a reduction in production costs and steps. Provided according to one embodiment of the present disclosure is a roof rack for a vehicle, comprising: a roof rail unit formed by injection molding; a pad unit on which the roof rail unit is mounted and which is coupled in contact with the roof rail unit; and mounting coupling members which are insert-molded in the roof rail unit and protrusively coupled via the lower part of the roof rail unit.

1 Claim, 6 Drawing Sheets

(56) References Cited

U.S. PATENT DOCUMENTS

| | | | | |
|---|---|---|---|---|
| 6,338,428 | B1* | 1/2002 | Kawasaki | B60R 9/04 |
| | | | | 224/309 |
| 2006/0103157 | A1* | 5/2006 | Raffler | B60R 9/04 |
| | | | | 296/29 |
| 2010/0259036 | A1* | 10/2010 | Taracko | B60R 21/045 |
| | | | | 280/752 |

FOREIGN PATENT DOCUMENTS

| | | |
|---|---|---|
| JP | 10-151993 A | 6/1998 |
| KR | 2000-0036385 A | 7/2000 |
| KR | 10-2005-0070461 A | 7/2005 |
| KR | 20050098316 A | 10/2005 |
| KR | 10-2009-0095131 A | 9/2009 |
| KR | 10-0957320 B1 | 5/2010 |
| KR | 10-1393508 B1 | 5/2014 |
| KR | 10-2015-0085577 A | 7/2015 |

OTHER PUBLICATIONS

Starrapid.com, The Cause and Avoidance of Sink Marks on Plastic Injection Molded Parts (https://www.starrapid.com/wp-content/uploads/2016/11/The-Cause-And-Avoidance-Of-Sink-Marks-On-Plastic-Injection-Molded-Parts.pdf), published Nov. 11, 2016 (see last page of NPL for dating). (Year: 2016).*

Rexplastics.com (https://rexplastics.com/product-development/fundamentals-plastic-part-design-part-3-sink-warp.com), published Feb. 2016. (Year: 2016).*

International Search Report for corresponding international application PCT/KR2017/010560 dated Dec. 20, 2017.

Korean Office Action dated May 30, 2019, in connection with the Korean Patent Application No. 10-2016-0125423.

Korean Decision to Grant Patent dated Jan. 15, 2020, in connection with the Korean Patent Application No. 10-2016-0125423.

* cited by examiner (PRIOR ART)

ROOF RACK FOR VEHICLE

CROSS REFERENCE TO RELATED APPLICATION

This present application is a national stage filing under 35 U.S.C § 371 of PCT application number PCT/KR2017/010560 filed on Sep. 25, 2017 which is based upon and claims the benefit of priority to Korean Patent Application No. 10-2016-0125423, filed on Sep. 29, 2016 in the Korean Intellectual Property Office. The disclosures of the above-listed applications are hereby incorporated by reference herein in their entirety.

TECHNICAL FIELD

The present disclosure relates to a roof rack for a vehicle, and more particularly, to a roof rack for a vehicle that a substantially lightweight material is used according to demands for improvements in a fuel efficiency and light weight of vehicle parts and reduces the number of parts of the vehicle and simplifies a process of manufacturing the vehicle parts and improves assembly and productivity of the vehicle to implement a reduction in cost incurred when the vehicle is manufactured and the simplified process of manufacturing the vehicle.

BACKGROUND ART

Generally, trunks are used when cargos are loaded onto vehicles. A rack device for fixing the cargos provided on a roof of vehicles (hereinafter; referred to as 'a roof rack') to load the cargo having a size such that the cargo is difficult to be loaded onto a limited trunk space as interests in leisure and sports are increased.

The roof rack is one of convenience parts that are mounted on a vehicle, and FIG. 1 is a schematic view of a general roof rack for a vehicle.

Referring to FIG. 1, a roof rack 10 is installed in a roof 3 (or a roof panel) of a vehicle 1.

As a result, various kinds of cargoes, for example, leisure equipment such as skis and a board, which are difficult to be stored in the trunk, may be fixed onto the roof rack 10 and may be transported.

In particular, as sport utility vehicle (SUV) is popularized, utilization of the roof rack is increasing.

On the other hand, most of the roof racks for the vehicle include a roof rail and a pad that is coupled under the roof rail and closely attached to the roof of the vehicle. However, as a conventional roof rack for a vehicle is made of a metal such as aluminum, the light weight of the conventional roof rack for the vehicle is limited even if the conventional roof rack for the vehicle is made of light weight metal.

Therefore, the roof rack for the vehicle may enables the fuel efficiency of the vehicle to be improved using a lightweight material (e.g., plastic, and the like) in comparison to the conventional material, and may have a high degree of freedom in design and a simple assembly structure in comparison to a conventional extrusion of aluminum by applying an injection method. Such a roof rack for the vehicle is requested to be developed.

A prior art document related to the present disclosure is Korean Patent No. 10-0957320 (May 3, 2010), and the prior art document discloses a technique for a roof rack assembly for a vehicle.

DISCLOSURE

Technical Problem

According to the present disclosure, there is provided a roof rack for a vehicle that implements light weight of the roof rack for the vehicle using a light weight synthetic resin material that may be injected and has a high degree of freedom in design, and results in improvements in productivity and reduction in cost, of a vehicle, through an easy assembly method.

Technical Solution

According to an embodiment of the present disclosure, there is provided a roof rack for a vehicle. The roof rack for the vehicle includes a rail that is injection molded, a pad on which the roof rail mounted and that contacts the roof rail, a fastening member that is insert-injected into the roof rail and protrudes from a lower portion of the roof rail.

Preferably, the pad includes a plate-shaped pad body that provides a mounting surface on which the roof rail is mounted; and a plurality of protrusions of the pad protruding upward from both ends of the pad body by a predetermined length.

At this time, the plurality of protrusions of the pad may face the roof rail at both ends of the roof rail and may have a shape that protrudes obliquely upward from the pad. At this time, preferably, a predetermined gap may be formed between the plurality of protrusions of the pad and the roof rail.

The fastening member includes a screw protruding from a lower portion of the roof rail; and an insertion fixing part that is connected to the screw and insert-injected to the roof rail during injection molding of the roof rail.

Further, the roof rail may be made of a plastic material. Preferably, polyamide (PA) or plastic materials including PA may be used, but the material of the roof rail is not limited to the above described materials.

Preferably, the roof rail includes a plurality of ribs having different sizes from one another; and a variable base whose thickness varies in proportion to the size of each of the plurality of ribs. As described above, as the variable base has a variation in thickness in proportion to the width and the length of the rib, it is possible to prevent an appearance of the variable base from sinking. At this time, the dimensions of the plurality of ribs and the variable bases are not limited to specific dimensions and may be appropriately changed as necessary.

A longitudinal end of the roof rail may have a curved shape by injection molding. A metal material (e.g., aluminum) is required to, after extrusion, bending, cutting, post-process the cut end to be curved. However, according to the present disclosure, if the roof rail is injection molded, the curve shape required for the end of the metal material may be formed without post-processing.

Advantageous Effects

According to the present disclosure, there is an advantage in that the desired strength and rigidity of a roof rack for a vehicle may be provided and light weight of the roof rack for the vehicle may be implemented by injection molding a plastic material in a different manner from a conventional method of extruding a metal material.

Further, according to the present disclosure, there is an advantage that it is easy to assemble the roof rail and the pad, and it is possible for the user to couple and uncouple the roof rail and the pad, thereby facilitating assembly and maintenance of the roof rack for the vehicle.

Further, according to the present disclosure, as the fastening member (e.g., a bolt) is insert-injected during injection molding of the roof rail, a cumbersome assembly process may be simplified, thereby improving productivity reducing the cost.

Further, according to the present disclosure, the number of components included in the roof rack for a vehicle is reduced in comparison to the roof rack for the vehicle, thereby reducing the manufacturing cost.

Further, according to the present disclosure, the roof rail may be formed by injection, thereby having a high degree of freedom in design in comparison to the conventional roof rack for the vehicle.

BEST MODE

Figure 1:
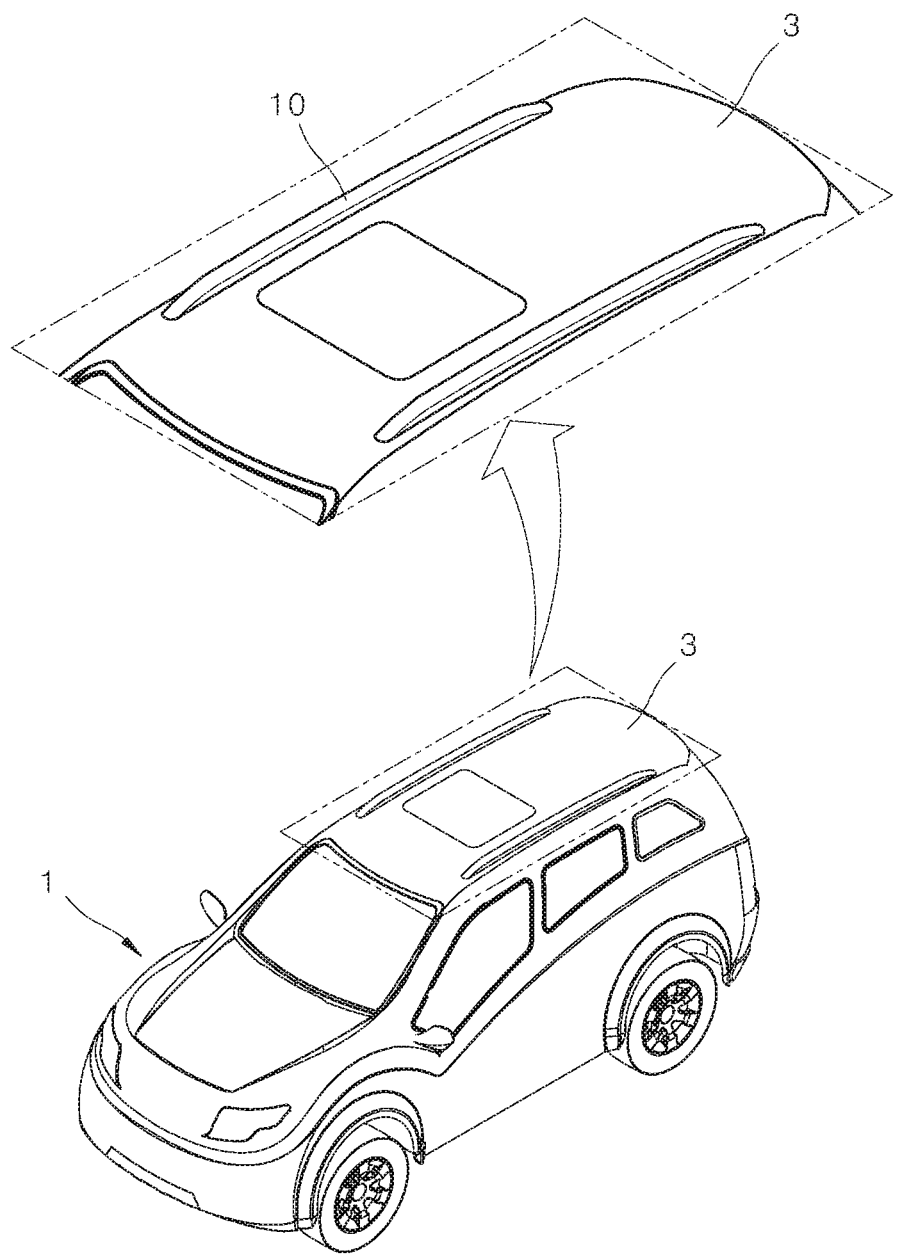
FIG. 1 is a perspective view and a partial enlarged view schematically showing a general roof rack for a vehicle.

Hereinafter, preferred embodiments of the present disclosure will be described in detail with reference to the accompanying drawings.

The advantages and features of the present disclosure and the method of achieving them will become apparent with reference to the embodiments described in detail below with accompanying drawings. The present disclosure may, however, be implemented in many different manners and should not be construed as limited to the embodiments set forth herein. Rather, these embodiments are provided so that this disclosure will be thorough and complete, and will fully convey the scope of the disclosure to those skilled in the art. The present disclosure is only defined by the scope of the claims. Like reference numerals refer to like elements throughout the specification.

In the description of the embodiments of the present disclosure, when it is deemed that a detailed description of known functions and configurations may unnecessarily obscure the gist of the present disclosure, the detailed description thereof will be omitted. The following terms are defined in consideration of the functions in the embodiments of the present disclosure, which may vary depending on the intention or the custom of the user and the operator. Therefore, the definition should be based on the contents throughout this specification.

The roof rack is one of convenience parts that are mounted on a vehicle and is installed on a roof (or a roof panel) of the vehicle so that various kinds of cargoes, for example, leisure equipment such as skis and hoard, which are difficult to be stored in a trunk, may be fixed onto the roof of the vehicle through the roof rack and may be transported. In particular, as sport utility vehicle (SUV) is popularized, the utilization of the roof rack is increasing.

However, most of the roof racks are made of a metal material such as aluminum. Even if a lightweight metal material is used, the light weight the roof rack has been limited. The present disclosure has been devised to provide a roof rack for a vehicle that may be structurally stable and may implement light weight, and may have a simple assembly structure by solving such a problem.

Figure 2:
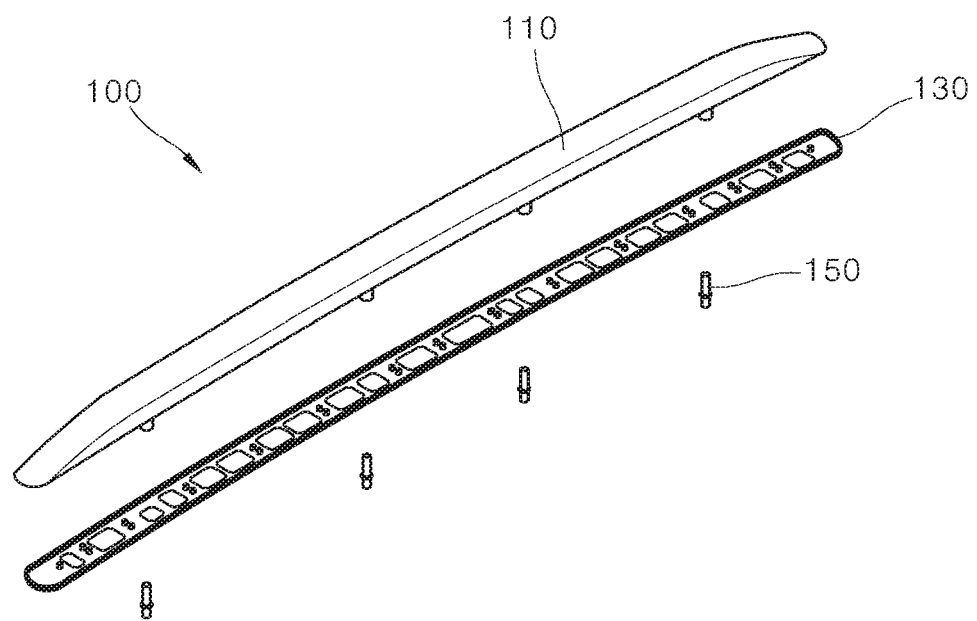
FIG. 2 is an exploded perspective view schematically showing a roof rack for a vehicle according to an embodiment of the present disclosure.
Figure 3:
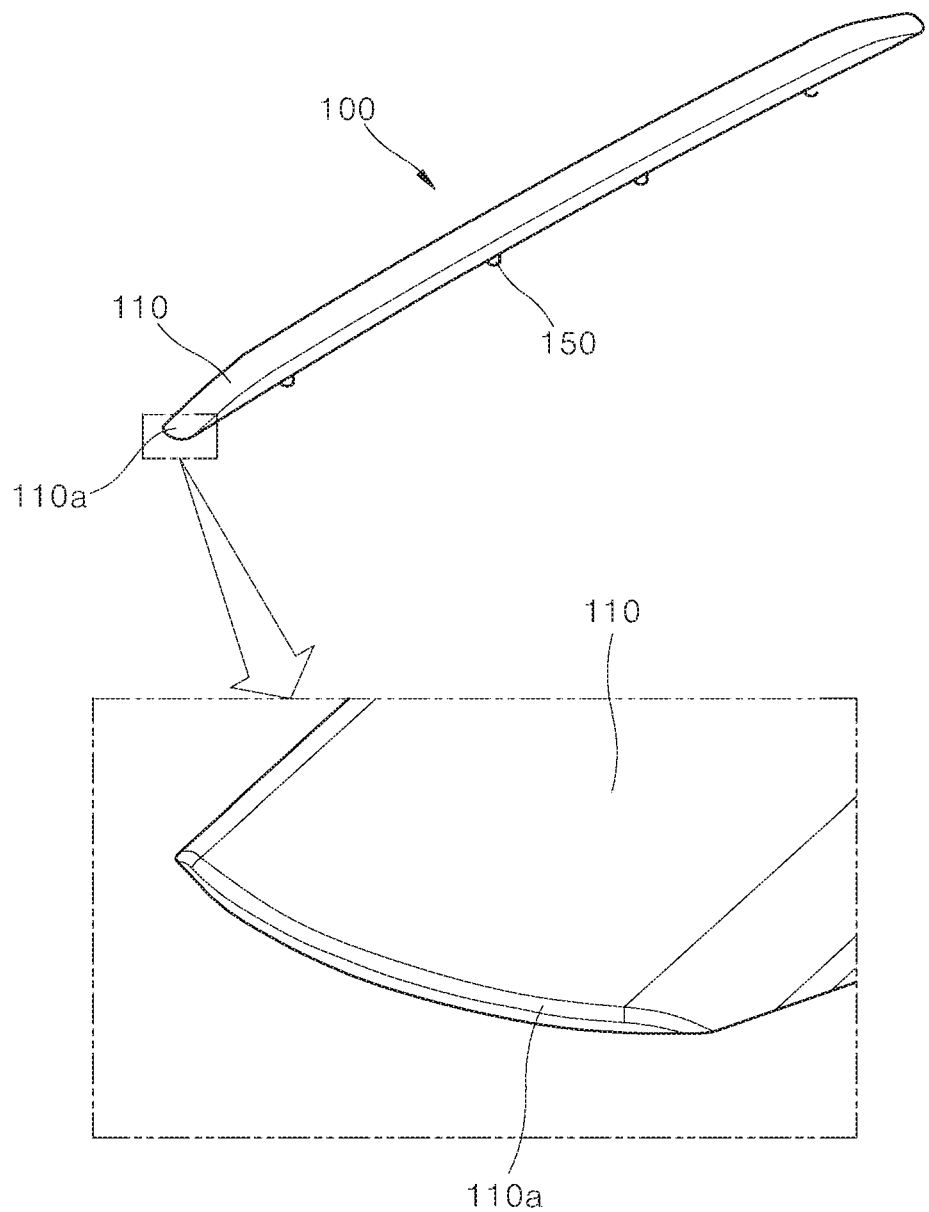
FIG. 3 is an enlarged view of a coupled state of a roof rack for a vehicle and an end of the roof rack according to an embodiment of the present disclosure.
Figure 4:
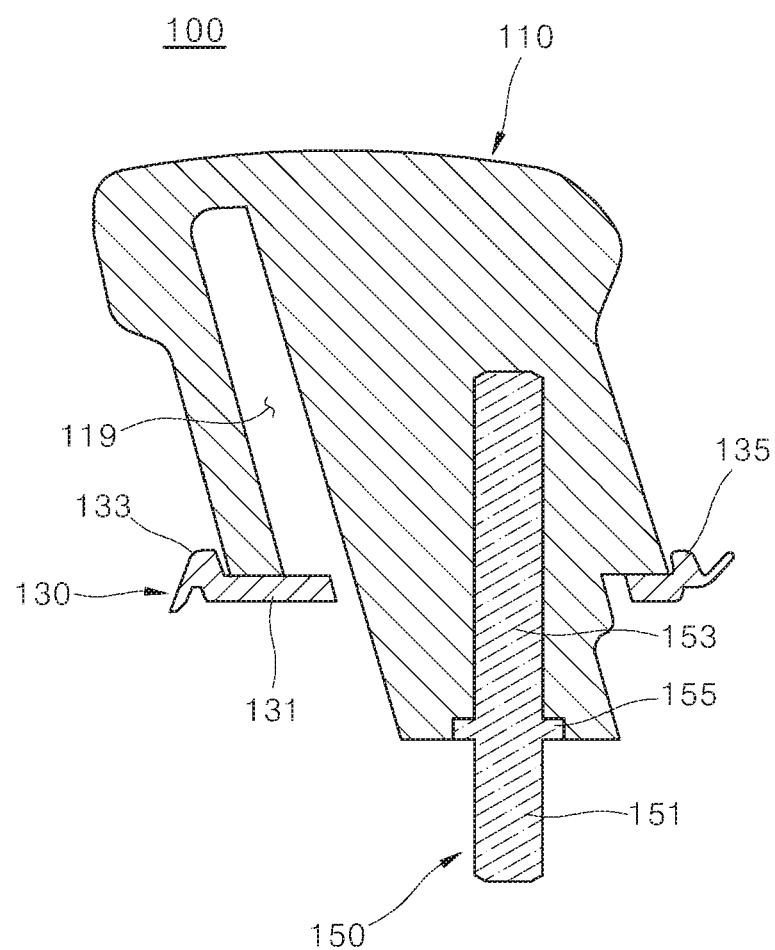
FIG. 4 is an enlarged view of a cross-sectional structure of a roof rack for a vehicle according to an embodiment of the present disclosure.

In the figures, FIG. 2 is an exploded perspective view schematically showing a roof rack for a vehicle according to an embodiment of the present disclosure, and FIG. 3 is an enlarged view of a state in which a roof rack for a vehicle is coupled and an end of a roof rack according to an embodiment of the present disclosure. FIG. 4 is an enlarged view of a cross-sectional structure of a roof rack for a vehicle according to an embodiment of the present disclosure.

According to an embodiment of the present disclosure, referring to FIGS. 2 to 4, a roof rack 100 for a vehicle includes a roof rail 110, a pad 130, and a fastening member 150.

The roof rail 110 may be injection molded using a plastic material.

The conventional roof rail 110 is molded by extrusion, and the like, using a metal material such as aluminum. However, in this case, an effect of reduction in weight was insignificant, and it was difficult to improve the moldability and the appearance quality of the conventional roof rail 110.

According to the embodiment of the present disclosure, the roof rail 110 may be easily and inexpensively injection molded to obtain a desired design using a plastic material, for example, polyimide (PA) or a plastic material including PA.

Preferably, the roof rail 110 may be made of a material such as PA6+MD40%, and the like, but the material of the roof rail is not limited to the above described material and other materials may be used.

Thus, the moldability and the appearance quality of the roof rail 110 may be improved, and the weight reduction effect may be further improved in comparison to the conventional case using a metal material such as aluminum.

Meanwhile, as the roof rail 110 is formed using the injection molding method, the number of processes may be reduced in comparison to the conventional injection method, and the design of the end 110*a* (see FIG. 3) of the roof rail 110 may be changed in various manners.

According to a conventional method using a metal material such as aluminum, and the like, a product may be formed first by an extrusion and bending process, and then the product may be cut while leaving both ends of the product at a required size, and then the cut portion may be post-processed to have a curved shape.

However, according to the embodiment, when the injection method is used, it is possible to mold the roof rail 110 to obtain the required shape. For example, it is also possible to mold a curved shape of the end of the roof rail 110 without additional process, and an effect of reducing the number of processes and improving the productivity may be obtained.

The pad 130 is a member at provides a mounting surface on which the roof rail 110 is mounted and contacts and is coupled to the roof rail 110.

The pad 130 may contact the roof rail 110. The contacted pad 130 and roof rail 110 may be mounted on the roof (or the roof panel) of the vehicle 3 (see FIG. 1).

As described above, the lower surface of the pad 130 is attached onto the roof 3 (see FIG. 1), and the upper surface of the pad 130 provides a mounting surface on which the roof rail 110 is mounted.

The pad 130 may be manufactured by injection molding in the similar to the molding of the roof rail 110.

Preferably, a plastic material may be used as the material of the pad 130. For example, thermoplastic elastomer (TPE) resin, and the like, may be used as a material of the pad 130. However, the material of the pad 130 is not limited the TPE resin, and different materials, which may be injected, from the TPE resin may also be used.

Unlike the roof rail 110, the pad 130 is not required to have high rigidity for directly supporting the load of the cargo loaded, and thus the pad 130 may be manufactured using a material different from that of the roof rail 110.

As shown in the cross-section of FIG. 4, the fastening member 150 may be coupled to the roof rail 110 in a shape protruding downward from the lower portion of the roof rail 110.

Specifically, the fastening member 150 may be insert-injected like the shape shown in FIG. 4 during injection molding of the roof rail 110.

The fastening member 150 is a bolt-shaped member. Carbon steel for mechanical structure (for example, SM25, and the like) may be used as the material of the fastening member 150. The material of the fastening member 150 is not limited to the above described material, and the materials different from carbon steel for mechanical structure may be used.

According to an embodiment of the present disclosure, referring to FIG. 4, a roof rack 100 for a vehicle includes a roof rail 110, a pad 130, and a fastening member 150.

The roof rail 110 may be manufactured in the same manner as the illustrated cross-sectional shape thereof. An inner hole 119 may be formed in the cross-section of the roof rail 110, and the shape, the size, and an arrangement of the roof rail 110 may be changed in various manners and the roof rail 11 is not limited to the shown forms.

Both lower ends of the roof rail 110 are mounted on the upper portion of the pad 130.

The pad 130 includes a pad body 131 and a plurality of protrusions 133 and 135 of the pad.

The pad body 131 may have a plate shape to provide a mounting surface on which the roof rail 110, more specifically, both lower ends of the roof rail 110 is/are mounted.

The plurality of protrusions 133 and 135 of the pad refer to a shape of the protrusion formed by protruding upward from both ends of the pad body 131 by a predetermined length.

As shown in FIG. 4, for example, the plurality of protrusions 133 and 135 of the pad protrude upward in a shape of surrounding both lower ends of the roof rail 110 at the outside of the roof rail 110. Preferably, the plurality of protrusions 133 and 135 of the pad face both lower ends of the roof rail 110, respectively, and may protrude obliquely upward by a predetermined gap so that the roof rail 110 is easily provided to the upper portion of the pad body 131 so as to be smoothly mounted on the pad body 131.

The fastening member 150 includes a screw 151 protruding from the lower portion of the roof rail 110 and provided to be fixed to the vehicle roof via a fastening nut, and the like when the roof rack is mounted on the roof of the vehicle.

The fastening member 150 further includes an insertion fixing portion 153 inserted into the inside of the roof rail 110 so as to be provided on the roof rail 110 in a shape in which the screw 151 protrudes. The insertion fixing portion 153 may be insert-injected into the region shown when the roof rail 110 is injection molded and may be inserted into the roof rail 110 in a rigid state.

The extended connector 155 in which the cross section of which is enlarged may be provided at a boundary between the screw 151 and the insertion fixing portion 153. The formation position and shape of the extended connector 155 may be changed in various manners.

Figure 5A:
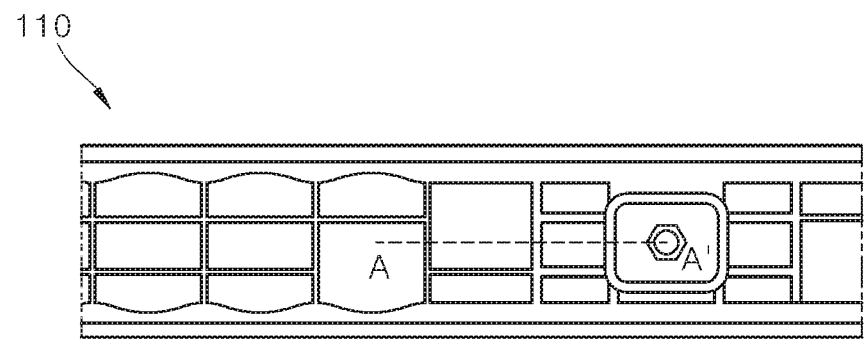
FIG. 5A, 5B are a rear view and a side view of a roof rail of a roof rack for a vehicle according to an embodiment of the present disclosure.
Figure 5B:
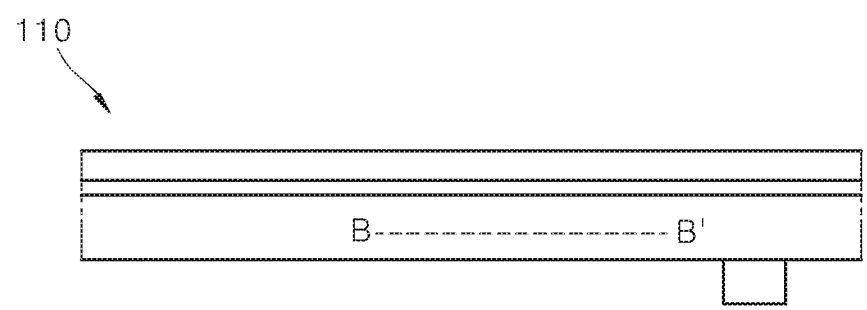
Figure 6A:
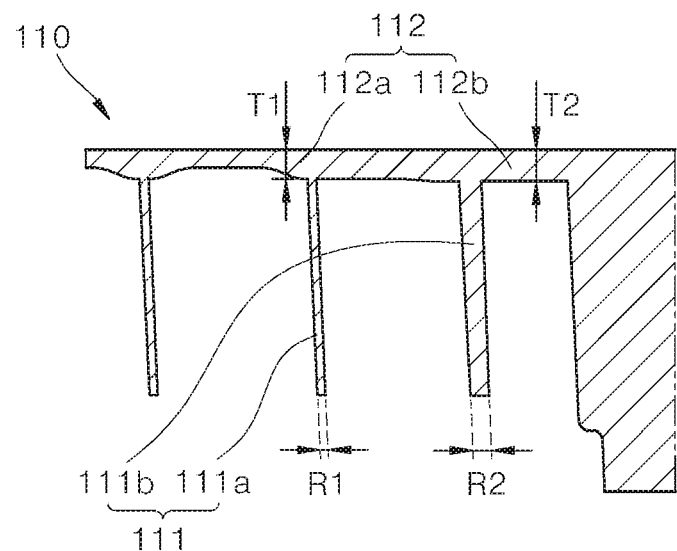
FIG. 6A, 6B are an enlarged view of section A-A' and section B-B' in FIG. 5A, 5B
Figure 6B:
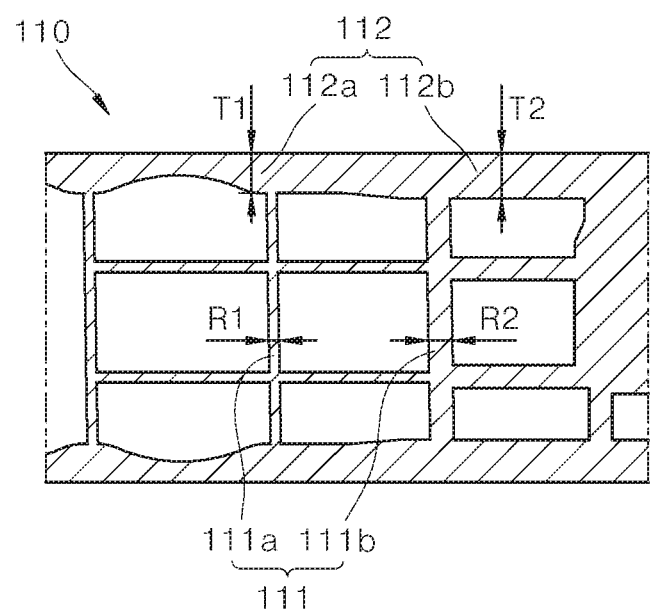

FIG. 5A, 5B are a rear view and a side view of a roof rail of a roof rack for a vehicle according to an embodiment of the present disclosure, and FIG. 6A, 6B are an enlarged view of section A-A' and section B-B' in FIG. 5A and FIG. 5B.

Referring to FIGS. 5A, 5B, 6A, and 6B, the roof rail 110 has a plurality of ribs 111: 111a and 111b (see FIG. 6A, 6B) having different sizes from one another and variable bases (112: 112a, 112b, see FIG. 6A, 6B) whose thickness is varied in proportion to the size of each of the plurality of ribs 111: 111a, and 111b.

As shown in FIG. 6A, 6B, the plurality of ribs 111 may include a first rib 111a and a second rib 111b having different sizes from each other. The variable base 112 may have a structure in which the thickness of which varies in proportion to the size of each of the plurality of ribs 111, for example, the first rib 111a and the second rib 111b, thereby preventing a sink of an appearance of the roof rail from occurring.

For example, a width R1 of the first rib 111a may be 1.0 to 1.5 mm, and a width R2 of the second rib 111b may be 2.0 to 3.0 mm. A thickness T1 of the first base 112a corresponding to the first rib 111a may be 3.5 to 4.5 mm and a thickness T2 of the second base 112b corresponding to the second rib 111b may be 4.0 to 5.5 mm.

As described above, the variable base 112 has a variation in thickness of the base in proportion to the width (or the length) of the plurality of ribs 111, so that the variable base 112 may have an advantage of preventing an appearance from sinking.

As described above, according to the configuration of the present disclosure, it is advantageous in that a desired strength and rigidity of the roof rack for the vehicle may be provided and the light weight of the roof rack for the vehicle may be implemented by injection molding the plastic material in a different manner from the conventional method of extruding the metal material.

Further, as the roof rail and the pad is simply assembled and the roof rail and the pad may be coupled and uncoupled by the user, thereby facilitating the assembly of the roof rail and the pad and the maintenance of the roof rail and the pad.

Further, the insert injection of the fastening member (for example, the bolt) during the injection molding of the roof rail may simplify the cumbersome assembly process. Further, the number of components the roof rack for the vehicle includes is reduced in comparison to the number of conventional components included in the roof rack for the vehicle includes, and the manufacturing cost may be reduced. Further, the roof rail may be formed by injection and may have a favorable technical effect with high degree of freedom in design.

While the present disclosure has been described with reference to exemplary embodiments thereof in the above, it will be apparent that the present disclosure is not limited to the embodiment and the figures disclosed in the present specification, and that various changes can be made by those skilled in the art within the scope of the technical spirit of the present disclosure. Further, it is apparent that, although the working effects obtained from the configuration of the present disclosure are not clearly described while describing the embodiments of the present disclosure, any effect, which can be predicted by the corresponding configuration, can also be recognized.

The invention claimed is:
1. A roof rack for a vehicle, comprising:
a roof rail that is injection molded;
a pad on which the roof rail is mounted and that contacts the roof rail; and
a mounting coupling member that is insert-injected to the roof rail and protrudes from a lower portion of the roof rail,
wherein the mounting coupling member comprises:
  a screw that protrudes from a lower portion of the roof rail;
  an insert fixing part that is connected to the screw and is insert-injected to the roof rail during injection molding of the roof rail; and
  an extended connector with an enlarged cross section provided at a boundary between the screw and the insert fixing part, and
wherein the roof rail comprises:
  a plurality of ribs having different sizes from one another; and
  a variable base whose thickness varies in proportion to the width or length of each of the plurality of ribs,
wherein a longitudinal end of the roof rail has a curved shape by injection molding,
wherein the plurality of ribs include a first rib and a second rib having different sizes from each other,
wherein the variable base has a structure in which the thickness varies in proportion to the size of the first rib and the second rib, thereby preventing a sink of an appearance of the roof rail from occurring,
wherein the pad comprises:
  a plate-shaped pad body that provides a mounting surface on which the roof rail is mounted; and
  a plurality of protrusions that protrude upward from both ends of the plate-shaped pad body by a predetermined length,
wherein the insert fixing part, the extended connector, and the screw protrude downward through the plate-shaped pad body,
wherein a width of the first rib is 1.0 to 1.5 mm, and a width of the second rib is 2.0 to 3.0 mm,
wherein the variable base includes a first base corresponding to the first rib and a second base corresponding to the second rib,
wherein a thickness of the first base is 3.5 to 4.5 mm and a thickness of the second base is 4.0 to 5.5 mm,
wherein the roof rail is molded using polyimide or a plastic material including polyimide, wherein the pad is molded using a material different from that of the roof rail,
wherein the plurality of protrusions face the roof rail at both sides of the roof rail and have a shape protruding upwards obliquely from the plate-shaped pad body,
wherein the plurality of protrusions face both lower ends of the roof rail and protrude obliquely upward by a predetermined gap, and
wherein the predetermined gap is formed between the side surfaces of each of the plurality of protrusions and the both lower ends of the roof rail.

* * * * *